United States Patent [19]

Sundblom et al.

[11] Patent Number: 4,622,503

[45] Date of Patent: Nov. 11, 1986

[54] VARIABLE PNEUMATIC OUTPUT MEANS FOR USE WITH OPHTHALMIC MICRO-SURGICAL INSTRUMENTS

[75] Inventors: Leif J. Sundblom, Castro Valley; Daniel D. Rogers, Berkeley; Wayne W. Rogers, Napa, all of Calif.

[73] Assignee: Medical Instrument Development Laboratories, Inc., San Leandro, Calif.

[21] Appl. No.: 781,393

[22] Filed: Sep. 26, 1985

[51] Int. Cl.$^4$ ............................................ G05D 15/00
[52] U.S. Cl. .................................... 318/645; 318/481; 604/22; 128/305; 251/129.13; 433/27
[58] Field of Search ......................... 604/22; 128/305; 251/129.11, 129.13; 137/625.65; 318/481, 645, 672; 433/27

[56] References Cited

U.S. PATENT DOCUMENTS

| | | | |
|---|---|---|---|
| 4,016,882 | 4/1977 | Broadwin et al. | 128/305 |
| 4,136,700 | 1/1979 | Broadwin et al. | 604/22 X |
| 4,181,288 | 1/1980 | Bylsma | 251/129.11 |
| 4,256,998 | 3/1981 | Samuels et al. | 318/645 X |
| 4,316,130 | 2/1982 | Louarn | 318/481 |
| 4,383,167 | 5/1983 | Gmeinder | 433/27 |
| 4,496,342 | 1/1985 | Banko | 604/22 X |

Primary Examiner—B. Dobeck
Attorney, Agent, or Firm—Zarley, McKee, Thomte, Voorhees & Sease

[57] ABSTRACT

A variable pneumatic output device for use with ophthmalic micro-surgical instruments including a reversible servo motor which operates in response to instructions from an electronic control circuit. The rotatable drive shaft of the servo motor is operatively connected to the adjustable level control of a precision pressure regulator which operates between a fully open level and a fully closed level. The pressure regulator is operatively connected between a pressurized air source and the pneumatically driven micro-surgical instrument and according to the instructions of the electronic control circuitry, the servo motor, through the connecting drive to the regulator, adjusts the level of pneumatic output to the surgical instrument.

8 Claims, 4 Drawing Figures

VARIABLE PNEUMATIC OUTPUT MEANS FOR USE WITH OPHTHALMIC MICRO-SURGICAL INSTRUMENTS

BACKGROUND OF THE INVENTION

1. Field of the Invention

The present invention relates to devices for varying the pneumatic output to a pneumatically driven device, and more particularly, to a variable pneumatic output device for use with pneumatically operated ophthmalic micro-surgical instruments.

2. Description of the Art

Ophthmalic micro-surgical procedures require extraordinarily minute instruments. Furthermore, the fragility and importance of the eye demands that these instruments be extremely accurate and controllable.

Means and methods ot satisfy these requirements are continuously being tested. Significant difficulties exist in perfecting instruments utilizing direct mechanical operation because of the extremely small sizes involved. Similarly, instruments driven electronically or electromechanically are sometimes problematic because of these size limitations.

An alternative and increasingly widely used driving method is the use of pneumatic power. The simplicity of structure and operation makes this method particularly suitable for micro-surgery.

However, difficulties still exist in pneumatic drive systems because of the small scale, relatively low air pressures and small orifices and channels required. This necessitates extremely accurate and closely controllable regulation of air input into the instrument.

Various methods of producing accurate, controllable, yet variable pneumatic pressure for ophthmalic surgery instruments are currently used in the art. However, there is need for improvement in control of the variability of pressure supplied to them.

It is therefore a principal object of the invention to provide a variable pneumatic output device which improves over, and solves many of the problems and deficiencies in the art caused by imprecision of prior control devices.

A further object of the invention is to provide a variable pneumtic output device which provides an accurate, controlled, yet variable pneumatic pressure output for use by an pneumatically driven ophthmalic micro-surgical instrument.

Another object of the invention is to provide a variable pneumatic output device which is controllable by the electronic control means and circuitry of an ophthmalic micro-surgery system.

A further object of the invention is to provide a variable pneumatic output device which is adjustable between and including a minimum fully closed level and a maximum fully open level with precision and accuracy.

Another object of the invention is to provide a variable output pneumatic device which provides a variable pneumatic output virtually instantaneously with the instructions from the control circuitry.

A further object of the invention is to provide a variable pneumatic output device which is reliable, simple in structure, durable, accurate, and economical.

Another object of the invention is to provide a variable pneumatic output device which does not require extensive calibration and maintenance.

These and other objects, features, and advantages of the invention will become apparent with reference to the accompanying drawings and specification.

SUMMARY OF THE INVENTION

The present invention utilizes an electronic reversible servo motor in combination with a precision pressure regulator to provide an extremely accurate and controllable pneumatic output to a pneumatically driven ophthmalic micro-surgical instrument. Present state of the art ophthmalic micro-surgery systems utilize electronic circuitry and/or microprocessors to control the operation of the instruments. Because of the minute size of these instruments, and the attendant problems of scale to achieve precise, controllable, and reliable operation, it is crucial that the pneumatic air supply to the pneumatically driven instruments be instantly and precisely controllable.

The precision pressure regulator insures that an accurate level of pneumatic pressure is output to the instrument. The regulator is adjustable between a fully open position and a fully closed position by an adjustment means.

The servo motor is in electrical communication with the control system for the ophthmalic surgery system. A mechanical connection is made between the servo motor and the regulatory or adjustment means of the regulator so that upon instructions from the control circuitry, the servo motor instantly operates to adjust the level of the regulator, thereby correspondingly controlling the pneumatic output to the surgical instrument. A conventional feedback loop or control subcircuitry can be used to constantly supply information regarding the amount of pressure at the surgical instrument to the control system or circuitry for comparison and subsequent control of the servo motor. The reversible nature of the servo motor allows it to both increase and decrease the set point pressure level of the regulator, which therefore provides the required control for the surgical instrument.

It is to be understood that there are a variety of ways in which the servo motor can be mechanically connected to the adjustment means of the regulator. Mechanical connections such as gears, belts and pulleys, friction wheels, connecting shafts, and the like, can be used. Additionally, direct axial link-up of the output shaft of the servo motor to the adjustment shaft of the regulator is possible.

The only calibration needed is an initialization so that the maximum level and minimum level of the regulator, as set point limits, are determined. Additionally, if a minimum pressure is required at all times to the surgical instrument, this point can be initially determined and then no further calibration is needed.

The flexible controllability of the servo motor allows for very rapid changes in the regulator level, or conversely very slow, gradual changes according to choice. It also allows for very minute but accurate changes in pneumatic output.

DETAILED DESCRIPTION OF THE PREFERRED EMBODIMENT

Figure 1:
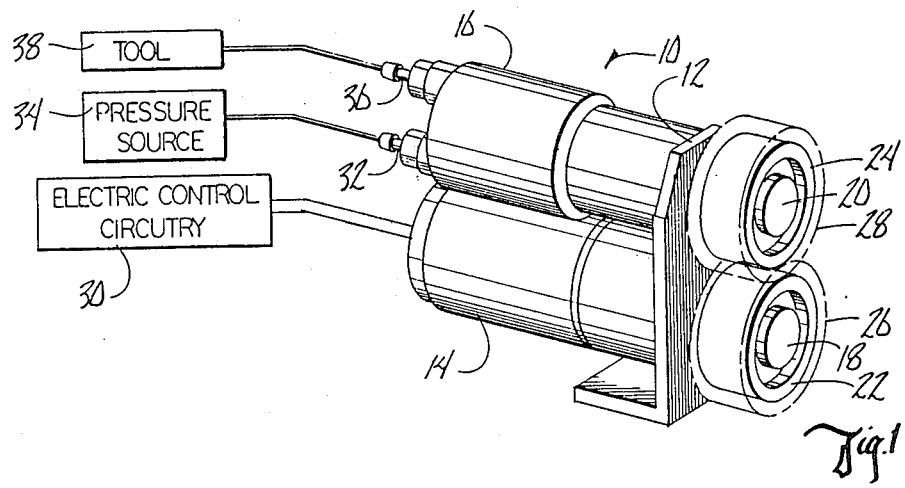
FIG. 1 is a perspective view of the invention with relevant attachments schematically represented.

With reference to the drawings, and particularly FIG. 1, the invention 10, A Variable Pneumatic Output Means For Use With Ophthalmic Micro-Surgical Instruments, is shown in perspective. A bracket 12 has securely mounted upon it, by means known within the art, an electronic servo motor 14 and a precision pressure regulator 16.

As is conventional, servo motor 14 has a reversibly rotatable shaft 18 which turns either clockwise or counterclockwise according to operation of the motor. Likewise, pressure regulator 16 has a threaded regulatory or adjustment shaft 20 which serves to alter the level of pressure regulation of regulator 16 by means known within the art.

In the preferred embodiment, rotatable shaft 18 of servo motor 14 and adjustment shaft 20 of regulator 16 are connected by gear wheels 22 and 24 which are secured to shafts 18 and 20 respectively. Gear wheel teeth 26 and 28 mateably intermesh with one another and are shown schematically in FIG. 1.

Servo motor 14 can be any suitable electronic servo motor as is known within the art. In the preferred embodiment, Swiss made motor type M1616M11-207 is utilized having a ratio of 5 to 1. Such a motor is manufactured by Portescap and can be purchased from Portescap U.S., Worcester, Pa. As described below, servo motor 14 is operatively connected to an electronic control circuitry 30 such as is known within the art from which it receives electrical instructions as to which direction to turn the rotatable shaft 18, including how far, and how fast. These factors are calibrated into the electronic circuitry before operation, as is known in the art.

Likewise, precision pressure regulator 16 is conventional such as is commonly known within the art. In the preferred embodiment regulator 16 is a Fairchild Model 70B subminiature pneumatic pressure regulator, manufactured by Fairchild Industrial Products Company of Winston Salem, N.C., and available to be purchased from the manufacturer. Regulator 16 has a pressurized air input 32 which is operatively connected to a pressurized air source 34. A pressurized air outlet 36 is operatively connected to the pneumatically driven tool 38. Regulator 16 functions to insure that a set level of pressurization is not exceeded, and is variable from completely closed to completely open. In the preferred embodiment its operating range is from 0 to 30 p.s.i.g..

As can be seen in FIG. 1, gear wheels 24 serve to mechanically communicate the movements of servo motor 14 to set the adjustment level of regulator 16. That is, each time rotatable shaft 18 moves, adjustment shaft 20 also moves either increasing or decreasing the set point of regulator 16 which correspondingly increases or decreases the level of pressurization allowed to pass to outlet 36 and onward to tool 38. Therefore, servo motor 14 can quickly, reliably, and accurately control the output pressure to the extremely sensitive ophthalmic micro-surgical tool 38.

Figure 2:
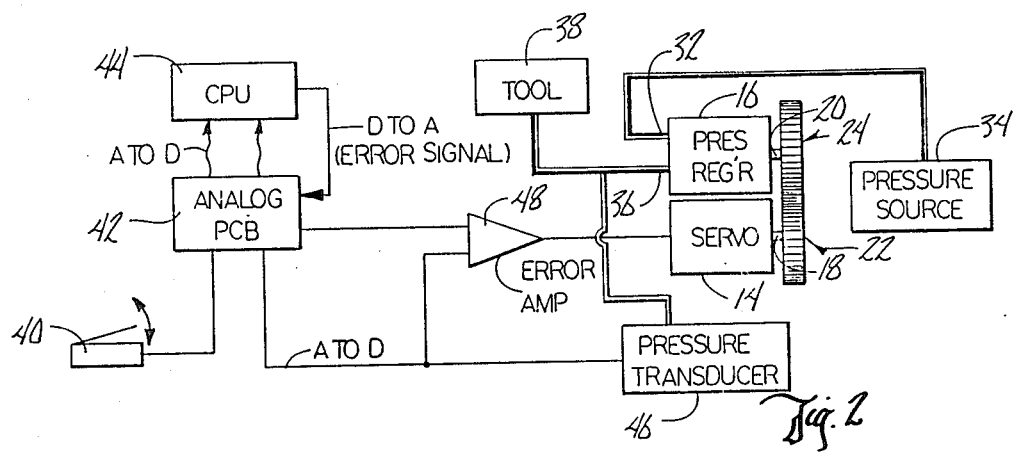
FIG. 2 is a schematic of the invention as it would exist within its working environment.

FIG. 2 sets the invention 10 within its working environment. As explained above, the invention 10 serves to provide an accurately controllable variable pressure to tool 38. If, for example, tool 38 were a pneumatically driven scissors, the invention 10 would function to smoothly and controllably increase and decrease the air pressure going to the tool to allow the ophthalmic surgeon infinite control of the closure and opening of the scissor blades.

Control by the surgeon begins with a manually operated switch such as foot pedal 40. Such foot pedals, known in the art, allow the surgeon to select between different modes of operation, and also control the speed of tool operation. The analogue printed circuit board (PCB) 42 serves as a conversion device for converting the signals issued by the foot pedal 40 into digital signals for processing by CPU 44. It should also be mentioned that conventional systems utilize a pressure transducer 46 to provide constant feedback as to the level of pressure entering tool 38. This signal from pressure transducer 46 is converted to digital by analogue PCB 42 for input to CPU 44.

As is conventional in the art, CPU 44 is programmed to convert the motions of foot pedal 40 into instructions to operate servo motor 14. The instructions of CPU 44 are converted from digital to analogue by analogue PCB 42 and then introduced into what is denominated as error amp 48 which essentially transmits the CPU instructions and compares them to the current pressure level via pressure transducer 46 to instruct servo motor 14 as to whether it should operate to increase pressure, decrease pressure, or remain the same. Pressure transducer 46 and error amp 48 thus operate with the rest of the control circuitry as a feedback control loop or subcircuit. The CPU 44 must be initialized as to the pressure limits of tool 38, and other initialization factors inherent in ophthalmic micro-surgery such as are known in the art. Similarly, servo motor 14 and pressure regulator 16 must be correspondingly calibrated and initialized to insure accurate operation.

For a description of one embodiment of a system such as comprised by CPU 44, analogue PCB 42, foot pedal 40, pressure transducer 46, and tool 38, reference can be made to the copending application by inventors Lian, Rogers, Rogers, Wang and Wang, entitled "Multi-Media Apparatus For Driving Power Surgical Instruments", which is commonly assigned with the present application to Medical Instrument Development Laboratories, Inc. of 2458 Verna Court, San Leandro, Calif., and is hereby incorporated by reference.

Figure 3:
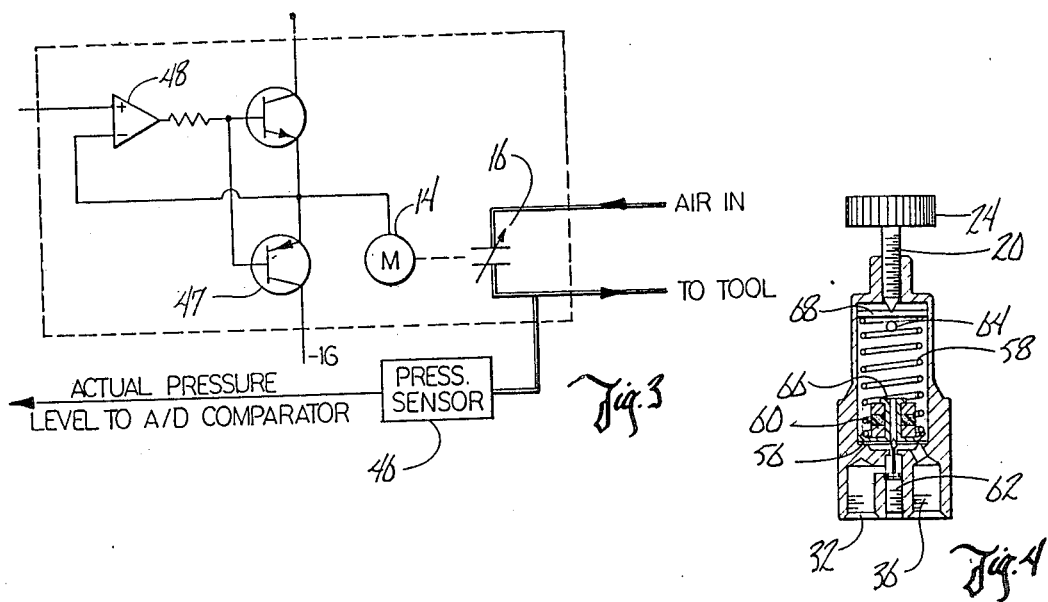
FIG. 3 is a partial schematic of one embodiment of electronic circuitry which can be utilized with the invention.
Figure 4:
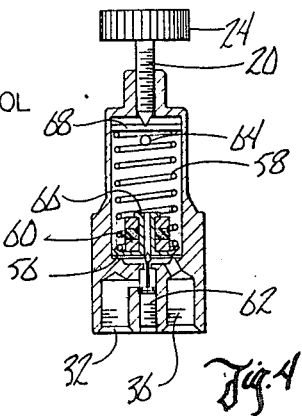
FIG. 4 is a cross sectional view of the precision pressure regulator used in the preferred embodiment of the invention.

FIG. 3 presents a partial schematic of the electronic circuitry involved with a system such as shown in FIG. 2. The electronic control circuitry of FIG. 3 is identical to that of the relevant circuitry of FIG. 2 of the copending application identified above which has been incorporated by reference, except that transistor 47, servo motor 14, and pressure regulator 16 are operatively substituted for the solenoid valve 139, 141 and exhaust vent 147 of that invention. Transistor 47 functions to reverse the current to servo motor 14, to in turn allow both clockwise and counter clockwise rotation of rotatable shaft 18 of servo motor 14. The feedback control circuitry is comprised of a loop between pressure transducer 46, the control circuitry, and error amp 48, as previously discussed. Other electrical control circuitry can be utilized as would be known within the art.

FIG. 5 illustrates the exact structure of pressure regulator 16 of the preferred embodiment. Operation of pressure regulator 16 is as follows. Air pressure enters the inlet port 54 and exerts a force on diaphram 56. Control operation is based on a force balance system in which spring 58 set for a specific pressure exerts a force through the piston 60 opposing the air pressure on the opposite side of the diaphram 56. When the set point pressure is reached, the forces are in balance. If the pressure downstream exceeds the set point, valve 62 will close, allowing the exhaust assembly to open and exhaust the incoming air through vent 64 on the valve body. Vibration damper 66 assures low noise operation of the valve. Adjustment shaft 20 is simply a threaded rod which abutts a washer 68 inside the valve body. By turning down adjustment shaft 20, washer 68 is depressed which in turn compresses spring 58 raising the set point of regulator 16.

In operation the invention 10 functions as follows. The operation of servo motor 14 and pressure regulator 16 are calibrated so that the minimum and maximum allowable pressure levels for a particular application are initialized into CPU 44. The respective connections to the electronic circuitry and the pneumatic pressure source 34 are made and the system is operable to the affect that by the mere depression and release of foot pedal 40, CPU 44 converts those manual instructions to electrical instructions to servo motor 14 to turn rotatable shaft 18 in a desired direction to cause gear wheels 24 and 26 to cooperate and turn adjustment shaft 20 and pressure regulator 16 to effect a pressure increase or decrease in tool 38, according to desire of the surgeon.

In the preferred embodiment, gear wheels 22 and 24 can be made of any suitable material such as is known in the art. A durable plastic material is sufficient. It is to be understood that gear wheels 22 and 24 can be of the same or different diameters according to choice as the calibration and initialization will compensate for the same.

It is also to be understood that the invention can take on various embodiments and configurations such as are known within the art. For example, gear wheels 24 and 26 could be replaced with any known means of connecting and translating the rotational movement of rotatable shaft 18 to rotational movement in adjustment shaft 20. Such alternatives include, but are not limited to, friction engaging wheels, a belt between pulleys, a connecting rod arrangement, and the like. Further, as an alternative, rotatable shaft 18 and adjustment shaft 20 could be linked in a direct-drive arrangement.

It is also to be understood that the invention 10 is adaptable to most, if not all present pneumatic systems for ophthalmic pneumatically driven tools and for the various pneumatic requirements thereof. For example, the invention 10 could be utilized with the previously mentioned pneumatically driven sissors to provide a closely controlled one-to-one sissors blade movement in correspondence to movement of the foot pedal 40. Alternatively, CPU 44 could automatically operate the cutting rate of the scissors at a predetermined rate which could be altered by positioning of foot pedal 40. This type of pneumatically driven scissors and the control of the same is disclosed in the co-pending application by inventors Parker and Rogers entitled "Handpiece Drive Apparatus for Powered Surgical Scissors", having an attorney docket number of MID 0007P, commonly assigned to Medical Instrument Development Laboratories, Inc., identified above, and also incorporated by reference herein. Moreover, invention 10 could be utilized with a reciprocal cutter instrument, or other instruments known within the art.

The electronic control circuitry controlling servo motor 14 can also vary, as is known within the art, or can be constructed for a particular use as would be known to those skilled in the art. While the preferred embodiment utilizes feedback from pressure transducer 46 in its operation, the invention 10 requires only introduction of analogue control signals from a suitable electronic control circuit for its operation.

The included preferred embodiment is given by way of example only, and not be way of limitation to the invention, which is solely described by the claims herein. Variations obvious to one skilled in the art will be included within the invention defined by the claims.

What is claimed is:

1. A variable pneumatic output servo motor and pressure regulator combination for use with ophthmalic micro-surgical instruments, the variable output being elecrtronically controlled by a control means operating said servo motor, comprising:
   a servo motor means in electrical communication with said control means and having a drive shaft being rotatable clockwise or counter clockwise according to instructions from said control means;
   a precision pressure regulator having an inlet port, an outlet port, an air pathway between said inlet and outlet ports, and a regulatory means for adjustably determining the level of pressure allowed to pass between said inlet and outlet ports, said regulatory means including a rotatable adjustment shaft extending from said regulator for adjusting the level of said regulatory means between a fully open level and a fully closed level;
   connecting drive means operatively connected between said drive shaft of said servo motor means and said adjustment shaft of said regulator so that rotation of said drive shaft causes rotation of said adjustment shaft causing adjustment of said regulatory means between and including said fully open level and said fully closed level.

2. The device of claim 1 wherein said connecting drive means conprises gears.

3. The device of claim 2 wherein said gears are of equal diameter.

4. The device of claim 1 wherein said connecting drive means comprises a connecting rod connected eccentrically between said drive shaft and said adjustment shaft.

5. The device of claim 1 wherein said connecting drive means comprises frictionally abutting wheels.

6. The device of claim 1 wherein said drive shaft of said servo motor means is axially and directly connected to said adjustment shaft of said regulator.

7. The device of claim 1 wherein said connecting drive means comprises pulleys and a belt therebetween.

8. The method of variably controlling pneumatic output to an ophthmalic micro-surgical instrument according to instructions from an electronic control means, comprising the steps of:
   operatively connecting a pressurized air source to the input port of a variable output precision pressure regulator having a level adjustment means;
   operatively connecting a pneumatically driven ophthmalic micro-surgical instrument to the output port of said regulator;
   operatively connecting said level adjustment means of said regulator to the rotatable drive shaft of a reversible electronic servo motor so that said output level of said regulator can be adjusted between a fully open level and a fully closed level by rotation of said drive shaft of said servo motor; and
   operatively connecting in electronic communication said servo motor to said electronic control means.

* * * * *